US008234586B2

(12) United States Patent
Glein

(10) Patent No.: US 8,234,586 B2
(45) Date of Patent: Jul. 31, 2012

(54) USER INTERFACE FRAMEWORK AND TECHNIQUES

(75) Inventor: Christopher A. Glein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 12/055,318

(22) Filed: Mar. 26, 2008

(65) Prior Publication Data

US 2009/0249249 A1 Oct. 1, 2009

(51) Int. Cl.
*G06F 3/048* (2006.01)
(52) U.S. Cl. .......................................... 715/810; 715/825
(58) Field of Classification Search .................. 715/810, 715/825; 707/999.1, E17.001
See application file for complete search history.

(56) References Cited

U.S. PATENT DOCUMENTS

| | | | | |
|---|---|---|---|---|
| 5,522,071 | A | * | 5/1996 | Guillen et al. ................ 719/315 |
| 5,980,096 | A | * | 11/1999 | Thalhammer-Reyero ............ 1/1 |
| 5,983,233 | A | | 11/1999 | Potonniee |
| 6,006,028 | A | * | 12/1999 | Aharon et al. ................ 703/21 |
| 6,501,491 | B1 | | 12/2002 | Brown et al. |
| 6,687,717 | B1 | | 2/2004 | Hamilton et al. |
| 6,910,049 | B2 | | 6/2005 | Fenton et al. |
| 6,996,830 | B1 | | 2/2006 | Hamilton et al. |
| 7,454,429 | B2 | * | 11/2008 | Rojer ................................ 1/1 |
| 7,650,355 | B1 | * | 1/2010 | Davis ........................... 715/234 |
| 7,900,192 | B2 | * | 3/2011 | Patterson ..................... 717/125 |
| 2002/0144234 | A1 | | 10/2002 | Yeh |
| 2003/0067494 | A1 | * | 4/2003 | Burns ........................... 345/810 |
| 2003/0208583 | A1 | * | 11/2003 | Schroeder ..................... 709/223 |
| 2005/0015401 | A1 | | 1/2005 | Chang et al. |
| 2005/0222986 | A1 | * | 10/2005 | Heix et al. ......................... 707/3 |
| 2005/0265701 | A1 | | 12/2005 | Lamkin et al. |
| 2007/0240079 | A1 | * | 10/2007 | Flynt et al. .................... 715/810 |
| 2008/0114753 | A1 | * | 5/2008 | Tal-Ezer ........................... 707/5 |
| 2008/0147671 | A1 | * | 6/2008 | Simon et al. .................... 707/10 |
| 2008/0201356 | A1 | * | 8/2008 | Jou ............................... 707/102 |

OTHER PUBLICATIONS

Tada, et al., "A File Naming Scheme Using Hierarchical-Keywords", COMPASC, Proceedings of the 26th International Computer Software and Applications Conference on Prolonging Software Life: Development and Redevelopment, Year of Publication: 2002, pp. 799-804.

* cited by examiner

*Primary Examiner* — Robert Timblin
*Assistant Examiner* — Randall Burns
(74) *Attorney, Agent, or Firm* — Mayer & Williams PC

(57) ABSTRACT

A set of declarative language instructions ("DEIs") defines three hierarchically-related data structures ("DSs") to provide a naming taxonomy for use with a user interface ("UI") framework. A first DS stores references to user-selectable objects ("USOs") that are presentable via a UI of a software application. The USOs provide access to other USOs or to resources. A second DS stores references to actions to be taken upon user selection of particular USOs. A third DS stores information for indirectly accessing resources or USO configuration data during runtime of the software application. Another set of DEIs defines sets of computer-executable instructions ("CEIs") corresponding to actions referred to via the second DS, which are triggered for execution upon user selection of particular USOs. Information from the third DS associated with a selected USO is passed to a particular set of CEIs. Runtime indirection and decoupling of content/functionality from UI components is achieved.

20 Claims, 4 Drawing Sheets

USER INTERFACE FRAMEWORK AND TECHNIQUES

BACKGROUND

Many types of software applications allow users to perform tasks such as taking actions, viewing content related to a particular activity, and/or utilizing functionality of the software applications. A software application generally provides a user interface such as a graphical user interface to facilitate users' ability to perform such tasks. A user interface often includes one or more menus of objects (for example, graphics, images, text, audio clips, video clips, and the like) that are navigable and selectable by users to perform various tasks.

A user interface framework specifies the way that user interface navigation is handled for a particular software application. Some common user interface frameworks supply unique strings/methods corresponding to each known item of functionality or content accessible via the user interface, and wrap such strings/methods into components. Then, a fixed, flat global function list is used to refer to the entire set of available components. A programmer may call into any component from any other component to specify handling for user interface navigation. Generally, such global function lists are hardcoded at programming time, result in tight couplings between components, and do not support runtime indirection.

SUMMARY

Techniques for using a declarative programming language to define aspects of a user interface framework are discussed herein. One set of declarative language instructions, which includes at least three hierarchically-related data structures, defines a naming taxonomy usable to present a user interface to a user of a particular software application. In an exemplary scenario, the set of declarative language instructions includes one or more markup documents that have markup elements or attributes defined by nested tags.

A first data structure (for example, a markup element or an attribute thereof) is populated with items of first data representing user-selectable objects presentable via the user interface of the software application. The user-selectable objects themselves are selectable by the user of the software application to either access one or more other user-selectable objects of the user interface, or to access resources accessible via the software application. Resources include but are not limited to content such as files, directories, and metadata, and computer programs that implement functionality of the software application or external functionality such as Web browsers or Internet-based services. A second data structure is populated with items of second data representing actions to be taken upon user selection of a particular user-selectable object via the user interface, such as navigation to a particular resource or re-direction to other user-selectable objects. A third data structure is populated with items of third data (for example, pointers, vectors, or URLs) that are usable to indirectly access resources or configuration information associated with user-selectable objects or both.

Another set of declarative language instructions defines a number of sets of computer-executable instructions and/or defines a manner for accessing sets of computer-executable instructions. The computer-executable instructions themselves may be written in any known or later developed programming language, such as an imperative programming language (script, for example). A particular set of computer-executable instructions corresponds to a particular action (for example, re-direction to other user-selectable objects or navigation to resources, including invoking of functionality) represented by a particular item of second data, and is configured to accept one or more items of third data as arguments. In an exemplary scenario, one or more XML documents are identified, which include event handlers that are triggered by user selection of a particular user-selectable object.

At runtime of the software application, the sets of declarative language instructions are processed dynamically to implement aspects of the user interface associated with the software application. An initial selection of one or more user-selectable objects represented by one or more items of first data is presented to the user. Upon user selection of a particular object, the selected object is identified as the currently-selected object, and the following items are identified: the associated action to be taken upon object selection, which is represented by a particular item of second data; the particular set of computer-executable instructions responsible for performing the action; and one or more items of third data associated with the currently-selected object. The one or more items of third data are passed as arguments to the particular set of computer-executable instructions, which are triggered for execution. Upon execution of the particular set of computer-executable instructions, the identified items of third data are used to indirectly access configuration data associated with one or more different user-selectable objects and/or to indirectly access one or more resources. Based on such indirect access, a subsequent selection of user-selectable objects is presented to the user via the user interface and/or resource access occurs (which may not result in further user interface).

In this manner, a hierarchical, declarative-language naming taxonomy is used to create flexible-to-change, efficient user interfaces, and can be used to trigger both functionality and visualizations of content. Generically-named elements such as the currently-selected object and argument placeholders, which are not directly coupled with particular functionality, enable runtime indirection to dynamic targets.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Aspects of the user interface/framework discussed herein are based on a declarative language naming taxonomy that is usable to create user interfaces that can be used by users to access various resources via a software application, including both internal functionality of a software application, external functionality such as access to the World Wide Web and/or Internet-based services, and content resources such as files, directories, associated metadata, and the like. For purposes of example, instance, or illustration—and not limitation—the use of extensible markup language ("XML"), which is a declarative programming language, to define a taxonomy for accessing resources associated with a media organizing application, is discussed herein. It will be understood, however, that other declarative programming languages and other software applications may be substituted without departing from the spirit or scope of the appended claims.

Figure 1:
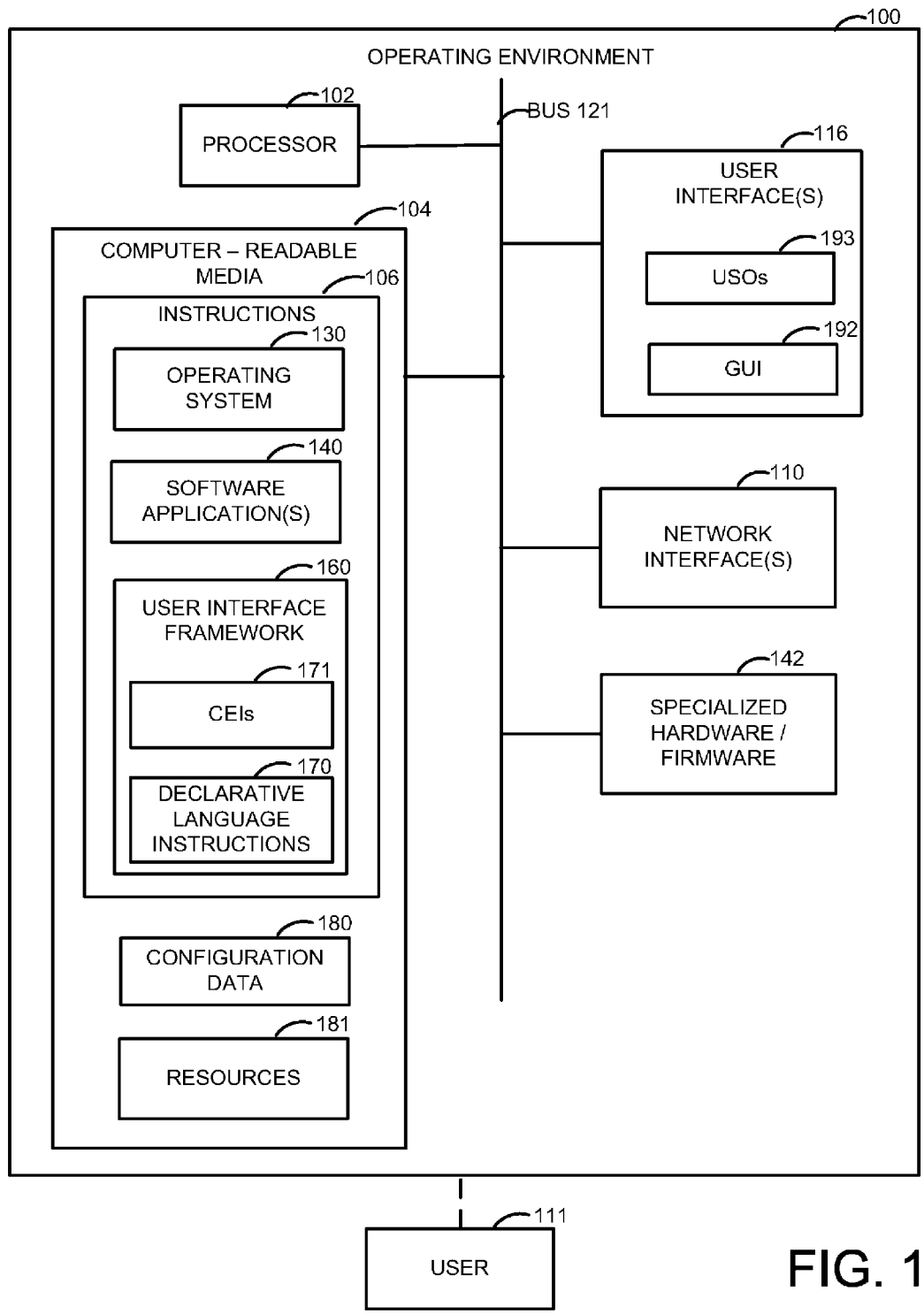
FIG. 1 is a simplified functional block diagram of an exemplary operating environment with which aspects of the user interface framework and/or techniques discussed herein may be implemented or used.

Turning now to the drawings, where like numerals designate like components, FIG. 1 is a simplified functional block diagram of an exemplary operating environment 100, with which aspects of a user interface framework that is based on a declarative language naming taxonomy and usable to create user interfaces for user 111 may be implemented or used. Operating environment 100 is indicative of a wide variety of general-purpose, special-purpose, client-or server-based, stand-alone or networked computing environments. Operating environment 100 may be, for example, a type of computer, such as a personal computer, a workstation, a server, a portable communication device, a personal digital assistant, an in-vehicle device, a laptop, a tablet, or any other type of stand-alone or networked computing device or component thereof now known or later developed. Operating environment 100 may also be a distributed computing network or Internet-based service, for example.

One or more components shown in FIG. 1 may be packaged together or separately to implement functions of operating environment 100 (in whole or in part) in a variety of ways. As shown, a bus 121 carries data, addresses, control signals and other information within, to, or from computing environment 100 or components thereof.

Network interface(s) 110 are one or more physical or logical elements that enhance the ability of operating environment 100 to receive information from, or transmit information to, another operating environment (not shown) via a communication medium. Examples of communication media include but are not limited to: wireless or wired signals; computer-readable media (such as computer-readable media 104, discussed further below); computer-executable instructions (such as computer-executable instructions 106, discussed further below); communication hardware or firmware; and communication protocols or techniques.

Specialized hardware/firmware 142 represents any hardware or firmware that implements functions of operating environment 100. Examples of specialized hardware/firmware 142 include encoder/decoders ("CODECs"), decrypters, application-specific integrated circuits, secure clocks, and the like.

A processor 102, which may be one or more real or virtual processors, controls functions of operating environment 100 by executing computer-executable instructions 106 (discussed further below).

Computer-readable media 104 represent any number and combination of local or remote components, in any form, now known or later developed, capable of recording, storing, or transmitting computer-readable data, such as instructions 106 (discussed further below) executable by processor 102, configuration data 180 (discussed further below), and resources 181 (also discussed further below). In particular, computer-readable media 104 may be, or may include: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof. Computer-readable media 104 may also include transmission media and data associated therewith. Examples of transmission media/data include, but are not limited to, data embodied in any form of wireline or wireless transmission, such as packetized or non-packetized data carried by a modulated carrier signal.

Resources 181 represent the various types of resources accessible via operating environment 100 or components thereof, including but not limited to content such as files, directories, metadata, and the like, and computer programs that implement/access internal or external functionality. Resources 181 may also have configuration data 180 (discussed below) associated therewith. As shown, resources 181 may be stored in temporary or persistent memory locations of computing system 100 or external devices.

Configuration data 180 represents one or more items of information used to present or access user-selectable objects 193 (discussed further below in connection with user interface(s) 116) and/or resources 181, such as selection status/state, size, shape, color, memory/storage usage, images/associated metadata, and the like. In one possible implementation, configuration data 180 is stored in temporary or persistent memory locations of computing system 100 and is accessible to components of operating environment 100.

Computer-executable instructions 106 represent any signal processing methods or stored instructions that electronically control predetermined operations on data. In general, computer-executable instructions 106 are implemented as software programs according to well-known practices for component-based software development, and encoded in computer-readable media (such as one or more types of computer-readable media 104). Software programs may be combined or distributed in various ways.

Software applications 140 and operating system 130 are examples of software programs. Examples of software applications 140 include but are not limited to operating system 130 and end-user software programs such as media organizing applications, media player applications, email applications, anti-malware applications, and the like. In one possible implementation, operating system 130 includes a component-based framework that supports components (including properties and events), objects, inheritance, polymorphism, and reflection, and provides an object-oriented component-based application programming interface ("API") such as that of the Microsoft®.NET™ framework.

A user interface framework 160 supports the use and development of user interface(s) 116 that can be used by users of software applications 140. In one possible implementation, user interface framework 160 comprises an aspect of operating system 130. As shown, aspects of user interface framework 160 use, include, or implement certain computer-executable instructions ("CEIs") 171 (discussed further below in connection with FIGS. 3 and 4) and declarative language instructions 170 (also discussed in connection with FIGS. 3 and 4).

User interface(s) 116 represent a combination of presentation tools and controls, implemented in whole or in part by user interface framework 160, that define the way user 111 interacts with a particular application or device. One type of user interface 116 is a graphical user interface ("GUI") 192, although any known or later developed type of user interface is possible. Presentation tools are used to receive input from, or provide output to, a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

User-selectable objects ("USOs") 193 represent physical or logical presentation tools or controls in the form of items or elements presentable via user interface 116, such as graphics, images, text, audio clips, video clips, and the like. USOs 193 are selectable by a user to navigate to other USOs within user interface 116 and/or access resources 181 such as content (for example, files, directories, metadata, and the like) or internal or external functionality with respect to operating environment 100 or individual components thereof.

Figure 2:
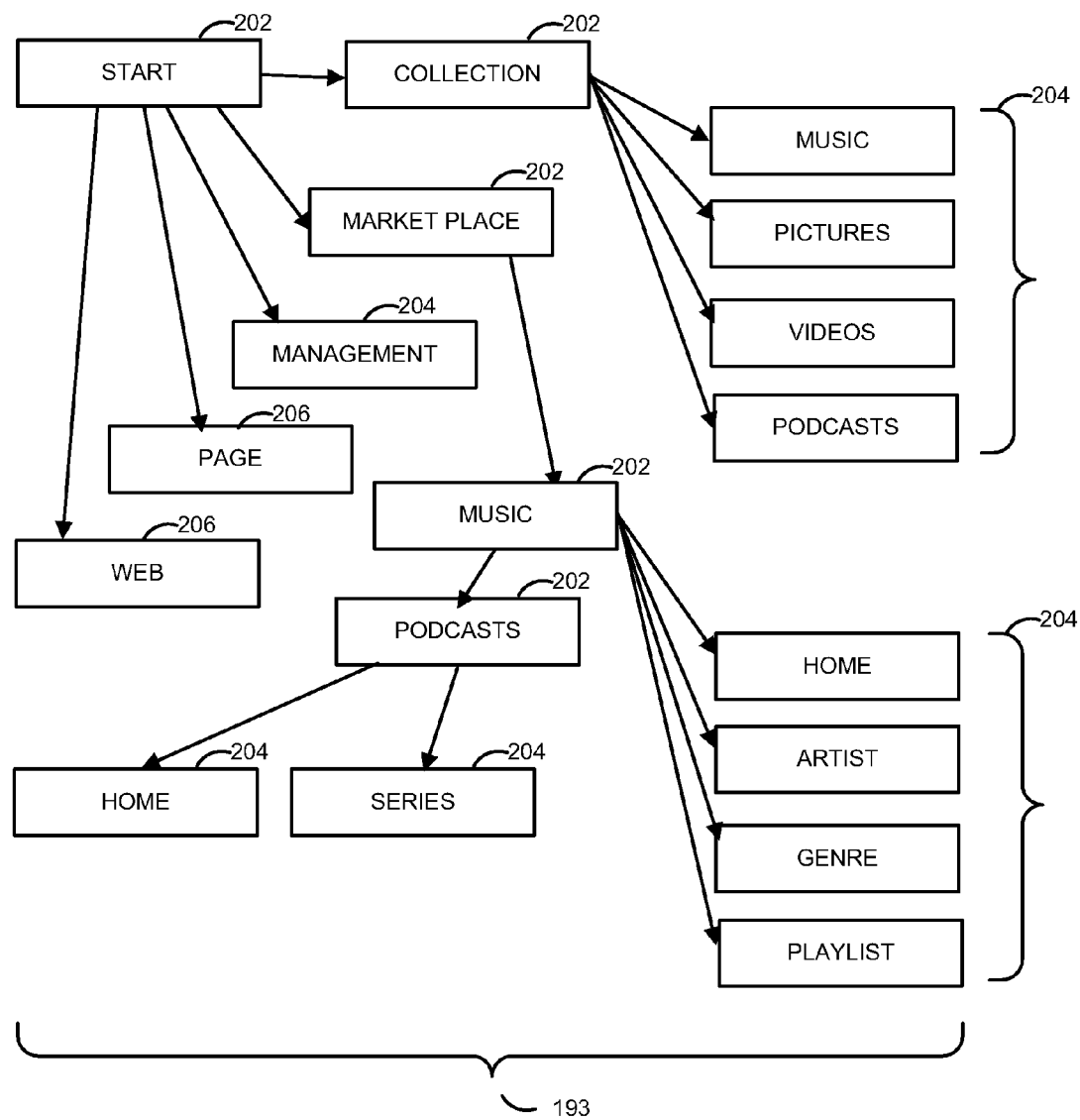
FIG. 2 illustrates an exemplary logical flow diagram (in block diagram form) of an exemplary implementation of a user interface for a software application that may be implemented or used by the operating environment shown in FIG. 1.

With continued reference to FIG. 1, FIG. 2 illustrates an exemplary logical flow diagram for various USOs 193 presentable to user 111 via an exemplary user interface 116, which for discussion purposes is a user interface for a software application 140 such as a media organizing application. As shown, USOs are in block diagram form, although it will be appreciated that USOs may be implemented using any desired media or combination thereof, including but not limited to images, text, graphics, audio clips, video clips, and the like. It will also be appreciated that the logical flow diagram of FIG. 2 is but one of many possible logical flow diagrams, and that any desired logical flow between any number and type of USOs 193 may be created using the techniques discussed herein.

Referring to FIG. 2, when USOs labeled with reference number 202 are selected by the user, the action taken is re-direction to one or more other USOs. When USOs labeled with reference number 204 are selected by the user, the action taken is navigation to certain content resources, such as files, directories, associated metadata, and the like. When USOs labeled with reference number 206 are selected by the user, the resulting action is execution of another action, such as invocation of certain internal or external resources in the form of functionality/computer programs.

Regarding USOs labeled with reference number 202, initially, the USO labeled "start" (which may be, for example, a USO presented to user 111 via a user interface associated with another software program such as operating system 130) is selectable to instantiate a first selection of USOs associated with the software application (which in the exemplary scenario is a media organizing application), including the USOs labeled "collection," "marketplace," "management," "page," and "web." User selection of USOs labeled "collection" and "marketplace" result in second selections of USOs being presented to the user. If the user selects "collection," the second selection of USOs includes the USOs labeled "music," "pictures," "videos," and "podcasts." If the user selects "marketplace," the second selection includes "music," which is further selectable to result in a third selection of USOs, including the USOs labeled "podcasts" (which is in turn further selectable to result in another selection of USOs including "home" and "series"), and the USOs labeled "home," "artist," "genre," and "playlist."

Regarding USOs labeled with reference number 204, when the USOs labeled "home," "series," "music," "pictures," "videos," "podcasts," "artist," "genre," or "playlist" are selected by the user, certain content resources are presented to the user, such as files, directories, associated metadata, and the like.

Regarding USOs labeled with reference number 206, when the USOs labeled "page" or "web" are selected by the user, certain internal or external functionality is invoked, such as a Web browser or Web page.

Figure 3:
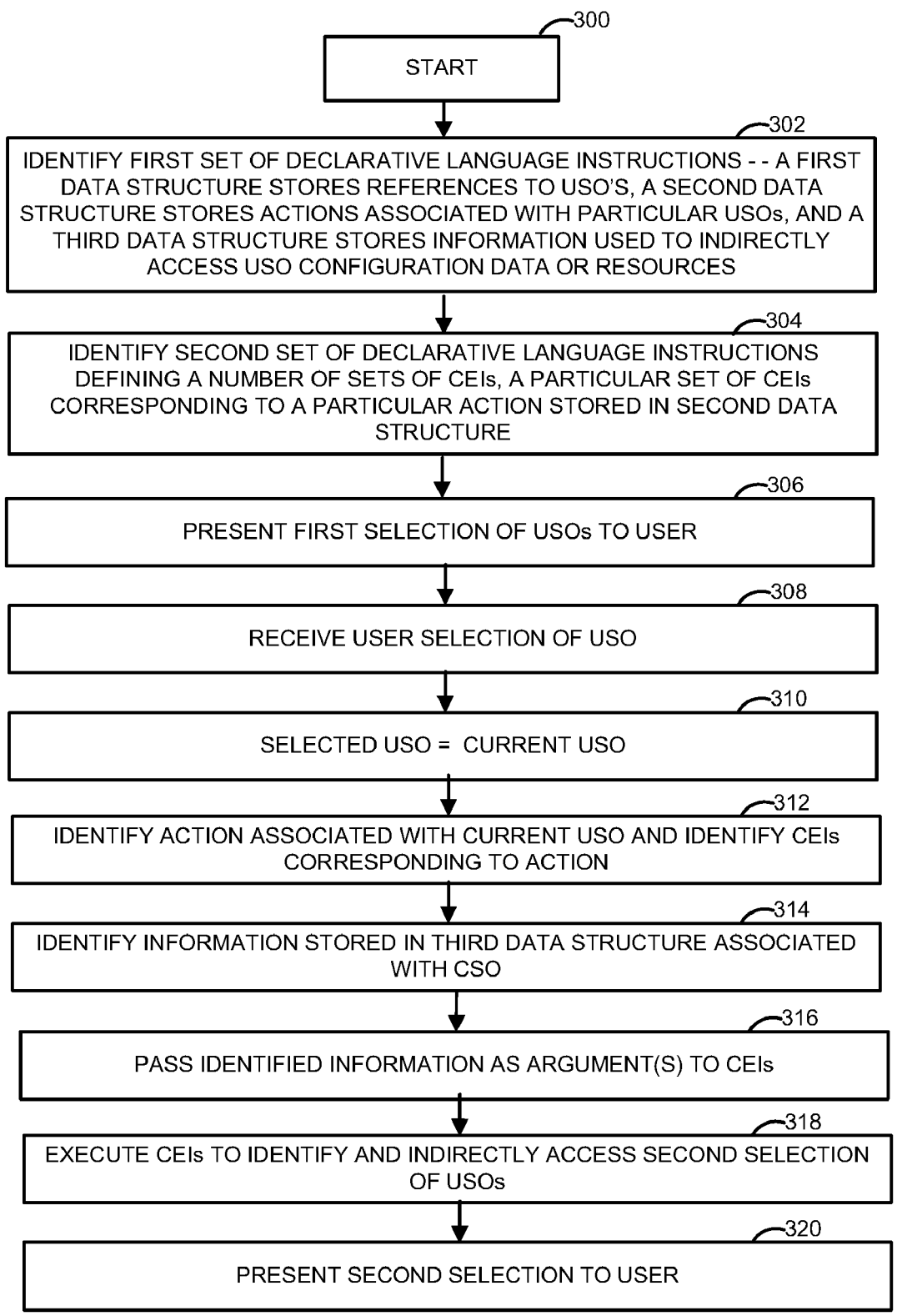
FIG. 3 is a flowchart of a method for presenting a user interface to a user of a software application, with reference to the exemplary logical flow diagram illustrated in FIG. 2.
Figure 4:
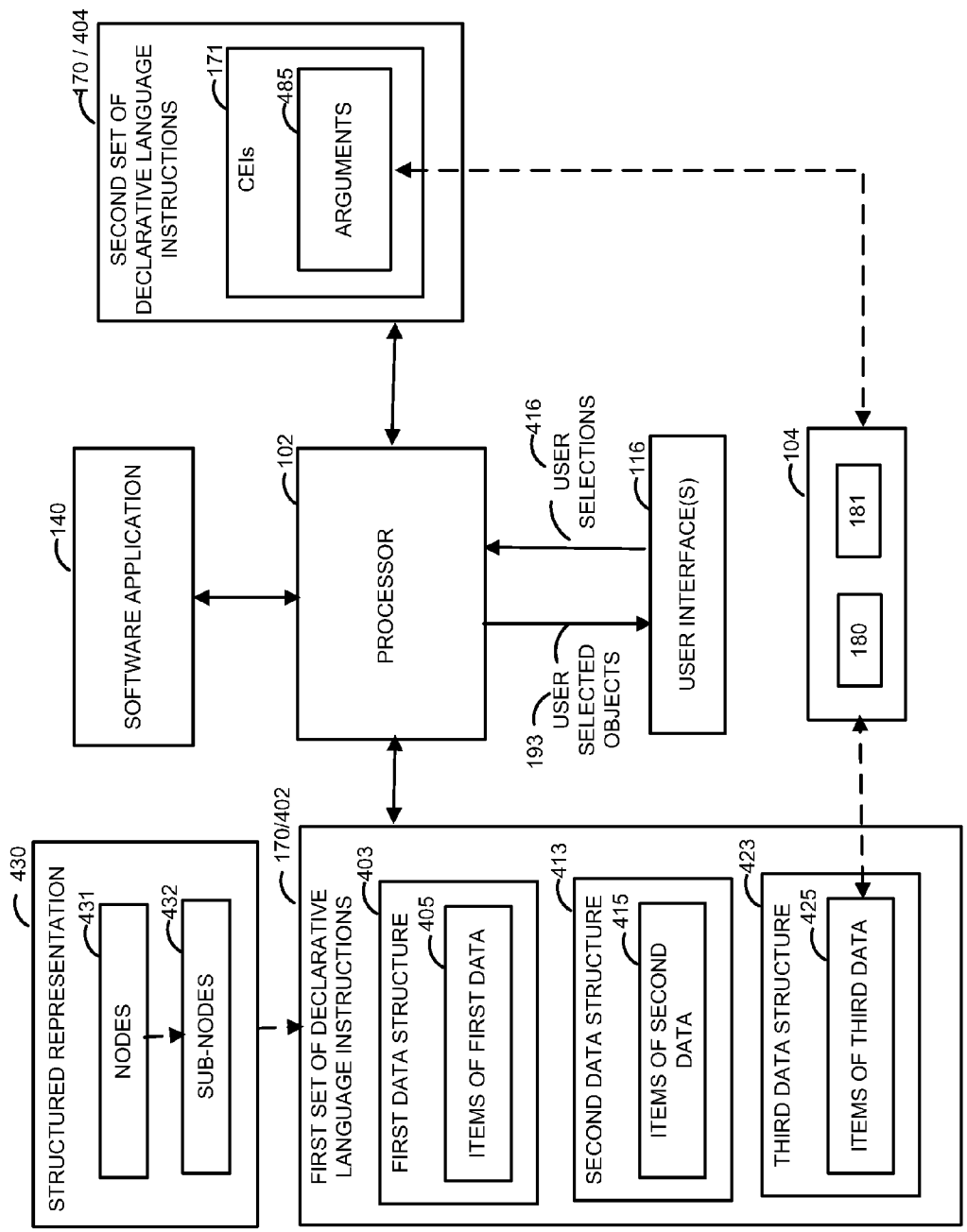
FIG. 4 is a simplified functional block diagram illustrating aspects of declarative language instructions that can be used in connection with aspects of the operating environment shown in FIG. 1 and/or the method shown in FIG. 3.

With continuing reference to FIGS. 1 and 2, FIG. 3 is a flowchart of a method for presenting a user interface to a user of a software application, such as user 111. For exemplary purposes, the user interface for the media organizing application implemented via the logical flow diagram of FIG. 2 is discussed, although it will be appreciated that virtually any user interface for any software program may be implemented using the described method, which is useful to reduce the need for hardcoded, global function lists and eliminate tight couplings between computer programs that are used to present various USOs and perform actions associated therewith.

The method illustrated in FIG. 3 may be implemented by computer-executable instructions, such as computer-executable instructions associated with user interface framework 160, which are stored in a computer-readable medium 104 and executed by one or more general, multi-purpose, or single-purpose processors, such as processor 102. Unless specifically stated, the methods are not constrained to a particular order or sequence. In addition, some of the methods or steps thereof can occur or be performed concurrently and/or repeatedly.

The method illustrated in FIG. 3 is initially described in general terms. The specifics of computer-executable instructions 171 and declarative language instructions 170, as well as their use to implement the exemplary USOs 193 and the logical flow diagram of FIG. 2, are subsequently described in more detail with reference to FIG. 4.

Referring to FIG. 3, the method begins at block 300 and continues at block 302, where a first set of declarative language instructions, such as a set of instructions within declarative language instructions 170, is identified. A declarative programming language is a high-level language whose instructions specify relationships between data in source material, which relationships are used to perform computation, instead of computation being performed pursuant to a series of commands. Exemplary source material includes an API specification for a user interface, source code, and the like, although many types of source material are possible. One exemplary declarative programming language is extensible markup language ("XML").

The declarative language instructions define at least three hierarchically-related data structures. Exemplary data structures include markup (for example, XML) elements/attributes, database fields, spreadsheet fields, and the like. A first data structure stores references to user-selectable objects, such as references (for example, strings or numeric values) to USOs 193 depicted in FIG. 2. A second data structure stores references to actions associated with particular USOs, such as actions taken when USOs referenced in the first data structure are selected by the user, including but not limited to references to: the re-direction action taken when USOs labeled with reference number 202 are selected by the user; the navigation-to-content resources taken when USOs labeled with reference number 204 are selected by the user; and the execution-of-another-action (such as invocation of certain internal or external functionality/computer programs) taken when USOs labeled with reference number 206 are selected by the user. A third data structure stores information (such as pointers, URLs, or vectors) used to indirectly access configuration data (such as configuration data 180) or resources (such as resources 181) associated with USOs.

Next, at block 304, a second set of declarative language instructions, such as a set of instructions within declarative language instructions 170, is identified. The second set of declarative language instructions defines a number of sets of computer-executable instructions ("CEIs"), such as CEIs 171. A particular set of CEIs corresponds to a particular action stored via the second data structure. In one possible implementation, the second set of declarative language instructions includes one or more XML documents, elements, or attributes to which a particular action stored via the second data structure (along with one or more arguments, such as arguments 485 shown and discussed in connection with FIG. 4) is passed upon user selection of a particular USO, resulting in the resolution of the action to an executable command (for example, the identification and/or creation of an event). The executable commands are not necessarily declarative language instructions. In one exemplary scenario, the executable commands that form particular sets of CEIs 171 are generally comprised of imperative language instructions (such as script commands/event handlers). An imperative programming language describes a sequence of commands, representing computations to be performed by a processor.

The sets of declarative language instructions referred to in blocks 302 and 304 are processed dynamically to implement aspects of the user interface associated with the software application. At block 306, based on the dynamic processing, a first selection of USOs is presented to the user. Generally, an initial selection of one or more user-selectable objects (such as USOs 193 labeled "collection," "marketplace," "management," "page," and "web"), which objects are represented by one or more items of first data stored in the first data structure, is presented to the user.

Upon user selection of a particular USO, as indicated at block 308, the selected USO becomes the current USO ("CSO") at block 310. At block 312, the action associated with the current USO, which is represented by an item of second data stored in the second data structure, is identified, and is used to identify a particular set of computer-executable instructions that is executable to perform the action. At block 314, information associated with the CSO that is stored by the third data structure in the form of one or more items of third data is identified. Exemplary items of third data include but are not limited to pointers, URLs, or vectors used to indirectly access configuration data or resources associated with the CSO. The items of third data identified at block 314 are passed as arguments to the set of CEIs identified at block 312, as indicated at block 316. At block 318, the CEIs are executed to identify and indirectly access a second selection of user-selectable items (either USOs or resources or both), which are presented to the user as indicated at block 320. It will be understood, however, that such further user interface is not necessary—upon user selection of a particular USO at block 308, the identified action may not result in any visible feedback(for example, the "save" action may not result in navigation or other visible changes to the user interface).

In an exemplary scenario, referring to the logic diagram of FIG. 2, if the CSO is "collection" or "marketplace," the identified action is the re-direction action. In the case of "collection," re-direction is to a second group of USOs including "music," "pictures," "videos," and "podcasts" ; in the case of "marketplace," re-direction is to the "music" USO. If the CSO is "management," the identified action is navigation-to-content resources. If the CSO is "page" or "web," the identified action is the execution-of-another-action (such as loading a particular Web page or launching an Internet browser application). The re-direction, navigation-to-content, and execution-of-another-action actions are accomplished via particular sets of CEIs 171 configured to perform such actions with respect to targets passed as arguments thereto in the form of items of third data associated with the CSO. For example, items of third data such as pointers, URLs, or vectors are usable to indirectly access configuration information associated with one or more other USOs and/or specific resources such as files, directories, metadata, or computer programs that perform internal or external functionality.

In this manner, a hierarchical, declarative-language naming taxonomy is used to create flexible-to-change, efficient user interfaces, and can be used to trigger both functionality and visualizations of content. Generically-named elements such as the currently-selected object and argument placeholders, which are not directly coupled with particular functionality, enable runtime indirection to dynamic targets.

With continuing reference to FIGS. 1-3, FIG. 4 is a simplified functional block diagram illustrating aspects of an architecture, including declarative language instructions 170, which may implement or use aspects of operating environment 100 and/or method 300 to present a user interface for a software application, such as software application 140.

As shown, processor 102 is operative to process one or more sets of declarative language instructions 170—a first set 402 and a second set 404—in accordance with a set of rules (such as the logic flow diagram illustrated in FIG. 2) defined for a particular software application, such as a media organizing application, to implement a particular user interface 116 for the software application. First set of declarative language instructions 402 may be represented by a structured representation 430 such as a document object model ("DOM")). USOs 193 are presented to a user (not shown) via the user interface, and the user makes user selections 416 of USOs 193 to navigate to other USOs within user interface 116 and/or access resources 181 such as content (for example, files, directories, metadata, and the like) or internal or external functionality with respect to software application 140. Generally, configuration data 180 associated with USOs and resources 181 accessible via USOs are stored in computer-readable media 104, such as local or remote temporary or persistent memory or storage locations.

In one possible implementation, declarative language instructions 170 include one or more XML documents that are comprised of XML elements. There is generally one root element in a declarative language document, no part of which appears in the content of any other element. For all other elements, element start-tags and end-tags are within the content of other elements, nested within each other to define hierarchical relationships.

The elements and attributes that comprise the data structures of a particular XML document are instructions conforming to an XML schema. At a high level, an XML schema includes: (1) a global element declaration, which associates an element name with an element type, and (2) a type definition, which defines attributes, sub-elements, and character data for elements of that type. Attributes of an element specify particular properties of the element using a name/value pair, with one attribute specifying a single element property.

Referring again to FIG. 4 in an exemplary scenario, first set of declarative language instructions 402 is an XML document, which includes a number of hierarchically-associated elements and attributes thereof, including a first data structure 403, a second data structure 413, and a third data structure 423. Hierarchical associations between first, second, and third data structures 403, 413, and 423 may be specified by nesting of various elements and attributes.

Items of first data 405 that populate first data structure 403 are references (such as strings, identification numbers, or other values) to USOs 193. Configuration data 180 associated with USOs 193 may be stored/accessed together with or separate from items of first data 405. Separate declarative language documents may be used to define references to individual USOs, or references to multiple USOs may be included within the same document (using particular properties/attribute values, for example). Items of second data 415 that populate second data structure 413 are references (such as strings, identification numbers, other XML objects, or other references) to particular actions that are taken when a user selects particular USOs 193 referred to in the first data structure. Items of third data 425 that populate third data structure 423 are values such as pointers, URLs, vectors, and the like that are used to indirectly access configuration data 180 or resources 181. Items of third data may be custom attributes that serve as pointers to memory or storage locations.

Generally, the specific XML schema to which data structures 303, 313, and 323 of declarative language document 170 conform may be created based on the desired data representation of the particular source material. In the exemplary scenario, a specific XML schema can be defined based on the API specifications for the user interface for software application 140.

During processing of the first set of declarative language instructions at runtime of software application 140, it may be desirable to create a structured representation, such as structured representation 430, of one or more XML documents being processed. In one possible implementation, structured representation 430 is a document object model ("DOM"). A DOM may include nodes 431 of several types, including a document node, which may be the root node, element nodes, attribute nodes, and text nodes. Any element may have attributes or text, including attributes themselves. During execution of software application 140 (such as user selection of USOs 193 via user interface 116) that affects DOM nodes, properties of any affected elements are recorded in the DOM, and may be used to trigger behaviors.

As shown, structured representation 430 includes nodes 431 corresponding to unique permutations of elements and attributes of the XML document. In one exemplary scenario, structured representation 430 is based on the logic flow diagram illustrated in FIG. 2. In the exemplary scenario, a portion of the structured representation would include nodes 431 based on unique permutations of USOs and actions populating the first and second data structures 403 and 413, respectively. Sub-nodes 432 may correspond to pointers/vectors/URLs association with configuration data and/or resources associated with particular nodes 431. Processing the structured representation generally entails evaluating expressions (such as XPATH expressions/queries) usable to retrieve values, such as particular nodes of structured representation 430. Essentially, an XPATH expression lists all the elements and/or attributes that lead to the nodes that are of interest, and a list of nodes that match the XPATH is returned from an XPATH query.

Referring again to FIG. 4, in an exemplary scenario, second set of declarative language instructions 404 may be part of, or linked to, first set of declarative language instructions 402. The second set of declarative language instructions 404 includes a number of sets of computer-executable instructions (CEIs 171). Generally, the CEIs themselves are imperative-language instructions, for example script commands. With respect to the exemplary scenario, a particular set of CEIs 171 corresponds to a particular action (such as re-direction to other USOs, navigation to particular resources, or performing other actions), and accepts one or more arguments 485 in the form of items of third data 425 (for example, pointers, vectors, or URLs associated with locations in local or remote computer-readable media), which arguments 485 are used to indirectly access configuration data 180 and/or resources 181 associated with the action to be taken. A separate helper function (not shown) may be used to create requests for access to and/or manipulation of configuration data 180 or resources 181.

At runtime of software application 140, values of arguments 465 may be ascertained based on the currently-selected USO, by iterating through elements and attributes of the first set of declarative language instructions 402 and/or nodes of structured representation 430 to create XPATH-value pairs. The XPATH-value pairs point to backend locations where configuration data 180 and/or resources 181 are stored. An array of XPATH-value pairs may be submitted to a helper function, which accesses and/or manipulates configuration data 180 or resources 181 in accordance with the action (for example, navigation, re-direction, or performing an action) performed by the particular set of CEIs 171. This allows for a highly generic implementation. Flexible-to-change user interfaces can be defined without the use of inefficient, hard-coded global function lists. High flexibility in configuration data/resource storage is also enabled.

Exemplary pseudo-code for implementing an exemplary first set of declarative language instructions is shown below. With reference to the logic flow diagram of FIG. 2, the code below is used to specify the USOs "music" and "podcasts," which are items of first data (attributes) associated with the XML element "DictionaryCommandHandlerName") to which a user is re-directed after selecting the "marketplace" USO. Upon selection of the "music" USO, for example, the user is re-directed to other USOs ("home," "artist," "genre," and "playlist") that can be used to navigate to various music-related resources; upon selection of the "podcasts" USO, for example, the user is re-directed to other USOs ("home" and "series") that can be used to navigate to various podcast-related resources. For each of the USOs that can be used to navigate to particular resources, items of third data (in the form of directory paths) are usable to indirectly access information associated with such resources.

```xml
        <Class Name="Navigation" Shared="true">
    <Properties>
        <DictionaryCommandHandler Name="Root">
            <Handlers>
                <!-- MUSIC -->
                <DictionaryCommandHandler Name="Music">
                    <Handlers>
                        <NavigationCommandHandler Name="Home"
                            UI= "res://MarketplaceResources!HomeData.uix#MusicHome"
                            FirstTierPreference="{FirstTierPivots.Store}"
                            SecondTierPreference="{StorePivots.Music}"
                            IsRootPage="true"/>
                        <NavigationCommandHandler Name="Genre"
                            UI= "res://MarketplaceResources!GenreData.uix#MarketplaceGenre"
                            FirstTierPreference="{FirstTierPivots.Store}"
                            SecondTierPreference="{StorePivots.Music}"/>
                        <NavigationCommandHandler Name="Artist"
                            UI= "res://MarketplaceResources!ArtistData.uix#MarketplaceArtist"
                            FirstTierPreference="{FirstTierPivots.Store}"
                            SecondTierPreference="{StorePivots.Music}"/>
                        <NavigationCommandHandler Name="Playlist"
                            UI= "res://MarketplaceResources!PlaylistData.uix#MarketplacePlaylist"
                            FirstTierPreference="{FirstTierPivots.Store}"
                            SecondTierPreference="{StorePivots.Music}"/>
                    </Handlers>
                </DictionaryCommandHandler>
                <!-- PODCASTS -->
                <DictionaryCommandHandler Name="Podcasts">
                    <Handlers>
                        <NavigationCommandHandler Name="Home"
                            UI=
"res://MarketplaceResources!PodcastsHomeData.uix#PodcastsHome"
                            FirstTierPreference="{FirstTierPivots.Store}"
                            SecondTierPreference="{StorePivots.Podcasts}"
                            IsRootPage="true"/>
                        <NavigationCommandHandler Name="Series"
                            UI= "res://MarketplaceResources!PodcastData.uix#PodcastSeriesData"
                            FirstTierPreference="{FirstTierPivots.Store}"
                            SecondTierPreference="{StorePivots.Podcasts}"/>
                    </Handlers>
                </DictionaryCommandHandler>
            </Handlers>
        </DictionaryCommandHandler>
    </Properties>
</Class>
</UIX>
```

Exemplary pseudo-code for implementing an exemplary second set of declarative language instructions is shown below. The second set of declarative language instructions is operative to resolve a command string into an action (redirection to other USOs or navigation to resources in the illustrated cases), and arrange for execution of the action based on the currently-selected USO.

Exemplary ICommandHandler interface:

```
/// <summary>
/// An object that can resolve a command string into an action.
/// </summary>
public interface ICommandHandler
{
    /// <summary>
    /// Evaluate the given command string.
    /// </summary>
    void Execute(string command, IDictionary commandArgs);
}
```

Exemplary code that initiates command evaluation:

```
/// <summary>
/// Object that will resolve the command passed into Shell.Execute( ).
/// </summary>
public ICommandHandler CommandHandler
{
    get
    {
        return _commandHandler;
    }
    set
    {
        if (_commandHandler != value)
        {
            _commandHandler = value;
            FirePropertyChanged("CommandHandler");
        }
    }
}
/// <summary>
/// Executes the command dictated by the registered command handler.
/// </summary>
public void Execute(string command, IDictionary commandArguments)
{
    if (_commandHandler == null)
    {
        throw new InvalidOperationException("No CommandHandler has
```

```
been registered. Unable to resolve shell command " + command);
    }
    Debug.WriteLineIf(TraceSwitches.ShellSwitch.TraceInfo,
        String.Format("Execute({0}) -> {1}", command,
        _commandHandler));
    // Resolve the command.
    _commandHandler.Execute(command, commandArguments);
}
private ICommandHandler _commandHandler;
```

Exemplary re-directing command handler

```
public class DictionaryCommandHandler : ICommandHandler
{
    /// <summary>
    /// DictionaryCommandHandler constructor
    /// </summary>
    public DictionaryCommandHandler( )
    {
        _handlers = new Dictionary<string, ICommandHandler>( );
        // Default divider value.
        _divider = "\\";
    }
    /// <summary>
    /// Our dictionary of url handlers.
    /// All values must be of type ICommandHandler.
    /// </summary>
    public IDictionary Handlers
    {
        get
        {
            return _handlers;
        }
    }
    /// <summary>
    /// The substring that we will use to break up an url into the key and
    /// args components.
    /// </summary>
    public string Divider
    {
        get
        {
            return _divider;
        }
        set
        {
            if (String.IsNullOrEmpty(value))
            {
                throw new ArgumentException("Must provide a non-empty
divider.", "value");
            }
            _divider = value;
        }
    }
    /// <summary>
    /// Evaluate the given command string.
    /// </summary>
    public void Execute(string command, IDictionary commandArgs)
    {
        // Break up the url into its raw parts.
        string prefix, suffix;
        SplitCommand(command, out prefix, out suffix);
        ICommandHandler handler = null;
        // Validate that we have a handler for this url.
        if (_handlers.ContainsKey(prefix))
        {
            handler = _handlers[prefix];
        }
        if (handler == null)
        {
            throw new ArgumentException("Unknownprefix: " + prefix,
            "prefix");
        }
        Debug.WriteLineIf(TraceSwitches.ShellSwitch.TraceInfo,
        String.Format("Execute({0}) -> {1}({2})", command, handler,
        suffix));
        // Pass off responsibility of resolving this url to the registered handler.
        handler.Execute(suffix, commandArgs);
    }
    /// <summary>
    /// Break down a given url into the prefix (key into our Handlers) and
    /// suffix (args to pass to the attached ICommandHandler) according to
    /// our defined Divider substring.
    /// Note that the suffix may not exist (if there is no divider).
    /// </summary>
    private void SplitCommand(string command, out string prefix, out
    string suffix)
    {
        if (String.IsNullOrEmpty(command))
        {
            throw new ArgumentException("Must provide a non-empty
command", "command");
        }
        Debug.Assert(!String.IsNullOrEmpty(_divider), "Divider value
should have already been validated.");
        // Find the divider
        int splitIndex = command.IndexOf(_divider);
        if (splitIndex < 0)
        {
            // No divider - use url as is
            prefix = command;
            suffix = null;
        }
        else
        {
            // Divider - break the url in two
            prefix = command.Substring(0, splitIndex);
            suffix = command.Substring(splitIndex + _divider.Length);
        }
    }
    private Dictionary<string, ICommandHandler> _handlers;
    private string _divider;
}
```

Various aspects of an operating environment and an architecture/techniques that are used to implement aspects of a user interface framework and/or user interfaces for software applications associated therewith have been described. It will be understood, however, that all of the described components/elements need not be used, nor must the components/elements, when used, be present concurrently. Elements/components described as being computer programs are not limited to implementation by any specific embodiments of computer programs, and rather are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A method for presenting to a user of a software application a user interface permitting the user to select an object associated with the application, the method comprising:
   providing a first set of declarative-language instructions having a plurality of data structures, including
      a first data structure storing a plurality of items of first data, each item of first data representing a corresponding user-selectable object presentable to the user via the user interface, wherein selection by the user via the user interface of a particular user-selectable object accesses one or more other user-selectable objects or a resource, or both, associated with the object selected by the user,
      a second data structure storing items of second data hierarchically associated with the first data structure, each item of second data representing a corresponding action to be taken upon user selection of a particular user-selectable object via the user interface, and
      a third data structure storing items of third data, each being hierarchically associated with a corresponding first data structure or second data structure or both, wherein the items of third data include references to locations of other user-selectable objects or resources to be accessed by selection of objects corresponding to items of first data;
   providing a second set of declarative-language instructions including a plurality of sets of computer-executable instructions, wherein each set corresponds to an action represented by a particular item of second data and is configured to accept items of third data as one or more arguments used in executing the instructions; and
   at runtime of the software application,
      presenting to a user via the user interface a first selection of items comprising user-selectable objects corresponding to respective items of first data;
      receiving a user selection of a user-selectable object from the first selection;
      identifying the selected user-selectable object as a currently-selected object, the currently-selected object being a first placeholder that is not directly coupled with particular functionality;
      identifying the item of second data representing the corresponding action to be taken upon user selection of the currently-selected object;
      identifying the set of computer-executable instructions corresponding to the action;
      identifying one or more items of third data associated with the currently-selected object;
      executing the identified set of computer-executable instructions using as one or more arguments as location references in the one or more identified items of third data, the one or more arguments collectively being a second placeholder that is not directly coupled with particular functionality wherein execution of the identified set of computer-executable instructions indirectly accesses information associated with one or more other user-selectable objects associated with the currently-selected object or one or more resources associated with the currently-selected object or both;
      using the information accessed by execution of the identified set of computer-executable instructions to identify a second selection of user-selectable items comprising either one or more of the other user-selectable objects or one or more resources or both, associated with the currently-selected object; and
      presenting the second selection to the user via the user interface so that the second selection of user-selectable items is dynamically triggered via runtime indirection responsively to the first and second placeholders.

2. The method according to claim 1, wherein a particular user-selectable object represented by a particular item of first data is selected from the group comprising: an audible object; and a visible object.

3. The method according to claim 2, wherein the audible objects and the visible objects are selected from the group comprising: audio clips; video clips; images; graphics; text; and combinations thereof.

4. The method according to claim 1, wherein a particular action represented by a particular item of second data is selected from the group comprising: re-direction to other user-selectable objects via the user interface; navigation to a particular resource; and performance of a function of the software application.

5. The method according to claim 1, wherein a particular resource is selected from the group comprising: a file; a directory; a device; metadata; an external functionality; and a computer program that implements a function of the software application.

6. The method according to claim 5, wherein a reference to a location of a particular resource is selected from the group comprising: a pointer; a uniform resource locator; and a vector.

7. The method according to claim 1, wherein the first set of declarative-language instructions comprises a first markup document and the second set of declarative-language instructions comprises a second markup document.

8. The method according to claim 7, wherein the first and second markup documents conform to syntax rules defined for extensible markup language ("XML").

9. The method according to claim 8, wherein the second data structure or the third data structure or both comprise attributes associated with the first data structure.

10. The method according to claim 7, wherein the first and second markup documents are part of a single file.

11. The method according to claim 10, wherein the method further comprises:
   during runtime of the software application, creating a structured representation of the first markup document, the structured representation having a plurality of nodes, particular nodes corresponding to unique permutations of items of first data representing user-selectable objects and items of second data representing actions, the structured representation having sub-nodes hierarchically associated with the nodes, the sub-nodes corresponding to items of third data.

12. The method according to claim 11, wherein the execution of the identified set of computer-executable instructions results in
   processing the structured representation dynamically at runtime of the software application to identify a current node corresponding to the currently-selected object;
   identifying one or more sub-nodes associated with the current node; and
   presenting to the user one or more of the user-selectable objects or one or more of the resources or both, based on the one or more identified sub-nodes.

13. The method according to claim 1, wherein the software application comprises an application for organizing media content.

14. A method for presenting a graphical user interface to a user of a software application, the method comprising:
    in a first portion of the graphical user interface, displaying a first subset of a plurality of user-selectable objects, wherein a particular object is selectable by the user to either access a resource or access another user-selectable object associated with the particular user-selectable object, each of the plurality of user-selectable objects being represented by a corresponding item of first data stored in a first declarative-language data structure;
    waiting to receive a user selection via the graphical user interface of a displayed user-selectable object from the first subset;
    when the user selection is received, identifying the selected user-selectable object as a currently-selected object, the currently-selected object being a first placeholder that is not directly coupled with particular functionality;
    identifying the particular item of first data associated with the currently-selected object;
    identifying a second declarative-language data structure hierarchically associated with the first declarative-language data structure, the second declarative-language data structure storing items of second data, each representing a corresponding action to be taken upon user selection of a particular user-selectable object;
    based on the particular item of first data, identifying the particular item of second data representing the action corresponding to the currently-selected object;
    identifying a third declarative-language data structure hierarchically associated with the first declarative-language data structure or the second declarative-language data structure or both, wherein the third declarative-language data structure stores items of third data including references to locations of other user-selectable objects or resources associated with the currently-selected object;
    identifying one or more items of third data associated with the currently-selected object; and
    using a set of computer-executable instructions to perform the action corresponding to the currently-selected object by providing to the computer-executable instructions location references in the identified one or more items of third data as arguments used in executing the computer-executable instructions, the arguments collectively being a second placeholder that is not directly coupled with particular functionality wherein execution of the set of computer-executable instructions accesses information associated with the resource or other user-selectable object so that a selection of the other user-selectable items is dynamically triggered for display to the user via runtime indirection responsively to the first and second placeholders without utilization of common functions that are hardcoded during programming of the data structures.

15. The method according to claim 14, wherein a reference to a location is selected from the group comprising a pointer, a uniform resource locator, and a vector.

16. The method according to claim 15, wherein the information accessed via execution of the identified set of computer-executable instructions comprises metadata associated with the one or more resources.

17. The method according to claim 14, wherein the processor is located within a device selected from the group comprising a client-side device and a server-side device.

18. An apparatus for presenting to a user of a software application a user interface permitting the user to select an object associated with running the application, the apparatus comprising:
    a computer-readable storage medium; and
    a processor responsive to the computer-readable storage medium and to a computer program, the computer program, when loaded into the processor, being configured to perform a method comprising
    providing a first set of declarative language instructions having a plurality of data structures including
        a first data structure storing a plurality of items of first data, each item of first data representing a corresponding user-selectable object presentable to the user via the user interface, wherein selection by the user via the user interface of a particular user-selectable object accesses one or more other user-selectable objects or a resource, or both, associated with the object selected by the user,
        a second data structure storing items of second data hierarchically associated with the first data structure, each item of second data representing a corresponding action to be taken upon user selection of a particular user-selectable object, and
        a third data structure storing items of third data, each being hierarchically associated with a corresponding first data structure or second data structure or both, wherein the items of third data include references to locations of other user-selectable objects or resources to be accessed by selection of objects corresponding to items of first data;
    providing a second set of declarative language instructions including a plurality of sets of computer-executable instructions, wherein each set corresponds to an action represented by a particular item of second data and is configured to accept items of third data as one or more arguments used in executing the instructions; and;
    at runtime of the software application,
        presenting to a user via the user interface a first selection of items comprising user-selectable objects corresponding to respective items of first data;
        receiving a user selection of a user-selectable object from the first selection;
        identifying the selected user-selectable object as a currently-selected object, the currently-selected object being a first placeholder that is not directly coupled with particular functionality;
        identifying the item of second data representing the corresponding action to be taken upon user selection of the currently-selected object;
        identifying the set of computer-executable instructions corresponding to the action;
        identifying one or more items of third data associated with the currently-selected object; and
        executing the identified set of computer-executable instructions using as one or more arguments as location references in the one or more identified items of third data, the one or more arguments collectively being a second placeholder that is not directly coupled with particular functionality wherein execution of the identified set of computer-executable instructions indirectly accesses information associated with one or more other user-selectable objects associated with the currently-selected object or one or more resources associated with the currently-selected object or both so that a selection of the one or more other user-selectable items or one or more resources associated with the currently-selected object is dynamically triggered for display to the user via runtime indirection responsively to the first and second placeholders.

19. The apparatus according to claim 18, wherein the method further comprises:

using the information accessed by execution of the identified set of computer-executable instructions to identify a second selection of user-selectable items comprising either one or more of the other user-selectable objects or one or more resources or both, associated with the currently-selected object; and presenting the second selection to the user via the user interface.

20. The apparatus according to claim 18, wherein the processor is located within a device selected from the group comprising: a client-side device and a server-side device.

* * * * *